(12) United States Patent
Dieker et al.

(10) Patent No.: US 8,635,175 B2
(45) Date of Patent: Jan. 21, 2014

(54) MANAGING CAPACITIES AND STRUCTURES IN STOCHASTIC NETWORKS (75) Inventors: Antonius B. Dieker, Atlanta, GA (US); Soumyadip Ghosh, Peekskill, NY (US); Mark S. Squillante, Pound Ridge, NY (US)

(73) Assignee: International Business Machines Corporation, Armonk, NY (US)

( * ) Notice: Subject to any disclaimer, the term of this patent is extended or adjusted under 35 U.S.C. 154(b) by 164 days.

(21) Appl. No.: 13/183,869

(22) Filed: Jul. 15, 2011

(65) Prior Publication Data
US 2013/0018829 A1    Jan. 17, 2013

(51) Int. Cl.
*G06F 15/18*    (2006.01)
(52) U.S. Cl.
USPC ........................................................... 706/14
(58) Field of Classification Search
None
See application file for complete search history.

(56) References Cited

U.S. PATENT DOCUMENTS

2002/0198995 A1\* 12/2002 Liu et al. ...................... 709/226
2007/0204226 A1\* 8/2007 Hindi et al. ................... 715/714

OTHER PUBLICATIONS

Harrison, J.M., "Stochastic Networks and Activity Analysis" Analytic Methods in applied Probability, American Mathematical Society, pp. 1-36, Providence RI, Jan. 24, 2002.

\* cited by examiner

*Primary Examiner* — Li-Wu Chang
(74) *Attorney, Agent, or Firm* — Scully, Scott, Murphy & Presser, P.C.; Daniel P. Morris, Esq.

(57) ABSTRACT

A system, method and computer program product for managing capacities and structures in a stochastic network. The method includes mapping the stochastic network to a general analytic model, e.g., a Brownian model, decomposing the general analytic model of the stochastic network into a set of smaller general analytic models, determining the capacities/structures for the set of analytic models as an intermediate solution for the capacities/structures of the stochastic network; and, determining the capacities/structures for the stochastic network starting at the intermediate solution for the capacities/structures using simulation-based methods.

24 Claims, 4 Drawing Sheets

MANAGING CAPACITIES AND STRUCTURES IN STOCHASTIC NETWORKS

BACKGROUND

The present invention generally relates to stochastic networks, and more particularly, implementation of stochastic network solutions in the analysis, modeling and optimization of multi-resource applications.

Stochastic networks have played a fundamental role as canonical models for a wide variety of multi-resource applications. Examples include business process management (WBM), computer capacity planning, manufacturing systems, multi-item inventory systems, call centers, and workforce management systems. Companies are investing in methodologies to determine the "best" resource capacities to satisfy the forecasted demand in these multi-resource applications.

Currently there are many methodologies based solely on simple analytic models, the assumptions of which often do not hold, and for which no bounds on errors can be calculated (e.g., computer capacity planning). Some methodologies are based solely on black-box use of simulation, which can be computationally expensive and require many iterations (e.g., OptTek; refer to http://www.opttek.com/). Moreover, there are few if any methodologies for managing structures in stochastic networks by choosing the most appropriate, such as the topology of the network and policies for resource sharing.

Stochastic networks have played a fundamental role as canonical models for a wide variety of multi-resource applications, including numerous types of computer and communication systems, manufacturing systems, multi-item inventory systems, call centers, and workforce management systems. The complexity of such applications continue to grow at a rapid pace, which in turn increases the technical difficulties of obtaining stochastic network solutions in the analysis, modeling and optimization of these applications. Moreover, the consistent stream of emerging multi-resource application areas continues to further exacerbate this growth trend in complexity.

One particularly important example is business performance management, which is a key emerging technology positioned to enable optimization of business process operations and information technology infrastructure through stochastic network models in order to achieve business performance targets.

There currently exists methodologies based solely on simple analytic models, the assumptions of which do not hold and for which there are no bounds on errors (e.g., computer capacity planning).

The primary difficulty in obtaining stochastic network solutions in the analysis, modeling and optimization of multi-resource applications concerns the complex dependencies among the processing stations, or queues, in the network. Indeed, it is only under relatively strong restrictions that the stationary joint distribution for the network has a product four in terms of the stationary distribution for each queue in isolation. Although the requirements for product-form solutions may not often hold in practice, the use of these results as approximations, possibly together with other heuristics, is a frequently employed approach in computer capacity planning applications. However, the accuracy of this approach, in the absence of any bounds on the errors, is an important concern from both a theoretical and practical perspective. Due to the difficulty of obtaining analytic solutions for non-product-form stochastic networks, alternative approaches are often based on various forms of stochastic simulation methods. In particular, there is essentially exclusive use of simulation for the analysis, modeling and optimization of stochastic network models of business processes, with few exceptions.

On the other hand, there are current methodologies that are based solely on black-box use of simulation, which can be computationally expensive, especially when used to solve optimization problems involving multidimensional stochastic systems and require many iterations (OptTek). Simulation-based techniques have been widely studied to address such stochastic optimization problems in general.

Of particular interest from both theoretical and practical perspectives are Brownian models of feedforward stochastic networks and non-linear optimization based on convex programming and trust region methods. Under the latter iterative methods, the objective function is approximated in a neighborhood of the current iterate (the so-called "trust region") by a surrogate model that is "easier" to deal with than the objective function; see, e.g., A. R. Conn, N. I. M. Gould, P. L. Toint. *Trust-Region Methods,* SIAM, 2000. The iterative procedure moves to the next iterate within the trust region that optimizes the surrogate model, where both the trust region and surrogate model are updated as more information about the true objective function is obtained.

State-of-art for trust-region methods are based on a black-box approach in which the structure and properties underlying the stochastic network are ignored.

There currently does not exist an approach for managing capacities and structures in stochastic networks, such as the topology of the network and policies for resource sharing.

SUMMARY

A system, methods and computer program product solves stochastic optimization problems by establishing and exploiting fundamental properties of the stochastic network and, by extending and exploiting nonlinear optimization methods at reduced computational costs and with increased accuracy.

The system and method exploits the underlying structure and properties for the stochastic network of interest that drastically increases the efficiency and accuracy of the solution, thus supporting real-time and interactive optimization of stochastic networks.

In one aspect, there is provided a system, methods and computer program product for managing structures in stochastic networks, such as the topology of the network and policies for resource sharing.

Further to this aspect, a general methodology for the optimization of feedforward Brownian networks is provided. This approach is based on combining and extending approaches and results from various fields including simulation optimization, trust-region methods, numerical methods, and fundamental properties of feedforward Brownian networks. By exploiting and extending results from each of these areas, the system and methods converge faster and yield better solutions than existing approaches.

In one embodiment, a computer-implemented method for managing structures in stochastic networks comprises: creating a general analytical model for a stochastic network; decomposing the general analytic model into a set of one or more decomposed analytic models; generating an optimization problem based on one or more of: capacities and structures in each of the one or more decomposed analytic models; obtaining an approximate solution to the optimization problem including identifying a value for the one or more of: capacities and structures for the set of analytic models as an intermediate solution for the one or more of: capacities and structures of the stochastic network; and, determining the one or more of: capacities and structures for the stochastic network based on the intermediate solution, wherein a programmed processor device is configured to perform one or more of the creating mapping, decomposing, generating, obtaining and determining.

Further to this aspect, the computer-implemented method runs, via a processor device, simulations to obtain parameters for the decomposed analytic models.

Further to this aspect, the determining the capacities/structures for the stochastic network further comprises: converting the identified optimal value for the capacity/structure of a general analytical model to a corresponding value for the original stochastic network.

Further, the decomposing the analytical model into one or more smaller decomposition models comprises: specifying an initial iterate value for the capacity/structure to be optimized; evaluating the network at the current iterate to determine the parameters of a functional form of the decomposition model at the current iterate; optimizing the decomposition model to obtain a next iterate of the optimization variable (capacity/structure); determining whether the next iterate meets a chosen stopping criteria, and; returning the current iterate as the (approximate) optimal solution if the next iterate meets the chosen stopping criteria.

Further, the method comprises setting a new iterate as a current value if the next iterate does not meet the chosen stopping criteria, and repeating the evaluating, optimizing and determining stopping criteria steps at the current iterate value to determine the parameters of a functional form of the decomposition model at the new iterate.

In a further aspect, a system for managing structures in stochastic networks comprises: a memory storage device; a processor coupled to the memory storage device and configured to perform a method comprising: creating a general analytical model for a stochastic network; decomposing the general analytic model into a set of one or more decomposed analytic models; generating an optimization problem based on one or more of: capacities and structures in each the one or more decomposed analytic models; obtaining an approximate solution to the optimization problem including identifying a value for the one or more of: capacities and structures for the set of analytic models as an intermediate solution for the one or more of: capacities and structures of the stochastic network; and, determining the one or more of: capacities and structures for the stochastic network based on the intermediate solution, wherein a programmed processor device is configured to perform one or more of the creating mapping, decomposing, generating, obtaining and determining A computer program product is provided for performing operations. The computer program product includes a storage medium readable by a processing circuit and storing instructions run by the processing circuit for running a method. The method is the same as listed above.

BRIEF DESCRIPTION OF THE DRAWINGS

The accompanying drawings are included to provide a further understanding of the present invention, and are incorporated in and constitute a part of this specification. The drawings illustrate embodiments of the invention and, together with the accompanying description, serve to explain the principles of the invention. In the drawings.

DETAILED DESCRIPTION

A system, method and computer program product for managing capacities and structures in stochastic networks is now described. The capacities of stochastic networks correspond to the capacities for each type and location of resources, where policies define the management/planning and sharing of resources across different types (including cross-trained resources) and different locations. The structures of stochastic networks correspond to topological and ordering aspects of workflow through the network of resources. As a specific example, solely for illustrative purposes and not limiting the invention, the capacities of a stochastic network of a hospital scenario might include the numbers of nurses, technicians, doctors, specialists, and the like, whereas the structures of this network might include what portions of the workflow are in parallel or in series, the order in which tasks of each workflow are performed, the flexibility and sharing of resources among the tasks to be performed, and so on.

Figure 4:
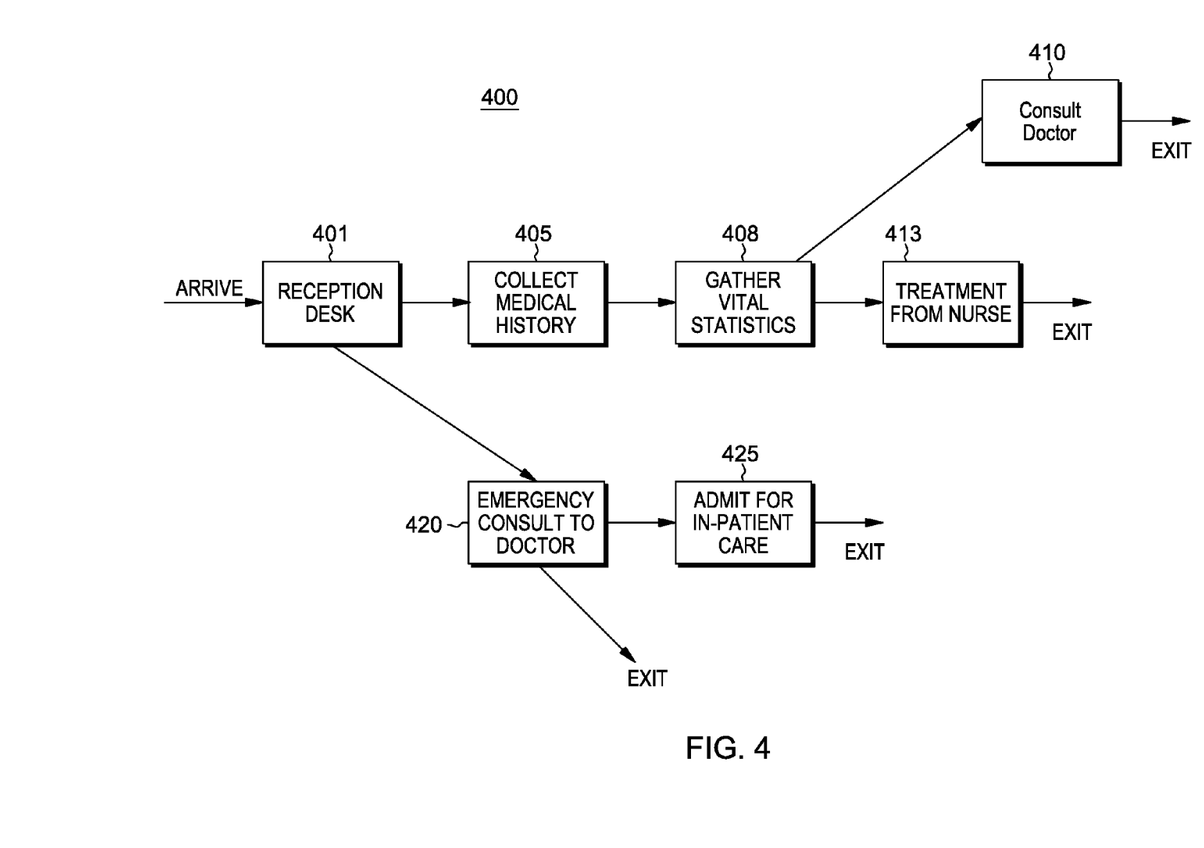
FIG. 4 shows a non-limiting example of a stochastic network model flow 400 of a hospital receiving patients.

FIG. 4 shows a non-limiting example, solely for the purposes of illustration, of a stochastic network model flow 400 of a hospital receiving patients. As shown, there is provided a set of tasks in the stochastic network model 400 of an emergency room in a hospital that models patient flow. The model includes nodes with a node 401 representing a capacity, e.g., a reception desk, where one or more nurses or like personnel performs collecting medical history at node 405, taking vital signs at node 408 and from there options including consulting a doctor at node 410, e.g., as to whether an examination/evaluation is to be further performed or, at node 413 whether treatment is to be directly administered by the nurse. At one extreme, these three tasks could be performed in a serial fashion one after the other as shown in FIG. 4; at the other extreme, these three tasks could all be performed at the same time in parallel; and there are various combinations in between. For example, the modeled patient flow 400 of FIG. 4 further includes parallel performed steps 420 and 425, where node 420 shows an immediate consultation with a doctor and which flow results in a node 425 representing the admitting of the patient in the in-patient care facility for emergency services. These variations represent different topological structures of the network (serial vs. parallel vs. combination) as well as different resource sharing opportunities, such as the sharing or partitioning of the nurse resources across the nodes 405, 408 of the network for collecting medical history and taking vital signs, respectively. It is understood that the application domain may impose additional constraints on the topological structures and resource sharing policies that are possible, such as not being able to perform an MRI in parallel with taking vital signs.

In one embodiment, the methodology for the optimization of stochastic networks supports an implementation in which Brownian networks are optimized. In other words, the stochastic networks subject to the processing described herein directly includes the class of Brownian networks.

Such an approach combines and extends approaches and results from various fields including simulation optimization, trust-region methods, numerical methods, and fundamental properties of Brownian networks. By combining and extending results from each of these areas, the methodology converges faster and yields better solutions than existing approaches. As a specific example, solely for the purposes of illustration and not limiting the invention in any way, any combination of the following steps are considered: given a functional form for a Brownian approximation of the original stochastic network; iteratively use a numerical solution of the Brownian network to obtain values for the variables of this functional form and use optimization methods to determine the optimal decision variables for this function; iteratively use simulation of the Brownian network to obtain values for the variables of this functional form and use optimization methods to determine the optimal decision variables for this function; there may further be given a functional form for the original stochastic network solution and use simulation-based optimization to determine the optimal decision variables for this stochastic network.

In addition to implementing the methodology for the optimization of stochastic networks with a fixed structure, the present disclosure also supports the optimization of stochastic networks over a set of feasible structures. To this end, the core solver used to determine the stochastic optimization under a specific network structure, implements an additional outer control loop determining which network structure from the feasible set should be investigated next, if any. This outer control loop intelligently and adaptively prunes the network structures in the feasible set which is to be considered in such a way that a relatively small subset of feasible structures are considered for optimization.

In a broader aspect, the present disclosure addresses methods for managing capacities and structures in stochastic network. The system and method is applicable to any network model that includes a flow, e.g., of people, product, etc., and is used to obtain solutions quickly (e.g., in a few order of magnitude of less time less than conventional simulation methods).

As an alternative to performing black-box simulations, a functional form (e.g., of a formula describing the way a stochastic network behaves) is used to obtain the analytic solution but without knowing all the parameters. The parameters of the functional form are then obtained which can be used to optimize the formula. In other words, the functional form provides a decomposition or break down of the true (unknown) function with some of the variables known and other variables left unknown such that once the latter variables are also known, the true function is then approximated by this form and this functional form can be optimized. As a specific non-limiting example, a function might take the form "(a+b)/c+(d*e)/(f+g)+h*i/j where a, c, e, f and i are known while b, d, g, h and j are unknown. In the hospital example, "(a+b)/c" might represent the time a patient spends as part of an initial check-in to verify insurance, "(d*e)/(f+g)" might represent the time a patient spends as part of an initial evaluation by a set of nurses (e.g., vital signs taken) and "h*i/j" might represent the time a patient spends as part of a subsequent evaluation by a set of doctors (e.g., examination and diagnosis)

In one aspect, as will be described in greater detail herein, the system and method while not knowing the function F representing the network model, assumes a functional form for F, taking a structure of the model into account, performing a numerical solution and/or simulation to obtain model parameters (function parameters), take the functional form and optimize the function. Given the optimized (more realistic) function, the process iterates to further optimize the function. Assuming the functional form, a numerical solution and/or simulation may be run and the revised function obtained is optimized. This process could proceed for a few iterations. For example, as the formula of the solution are determined as part of the invention but variables of the formula are not known, as described herein, a numerical solution and/or simulation(s) is (are) run to obtain unknown variables and optimize the function.

Figure 1A:
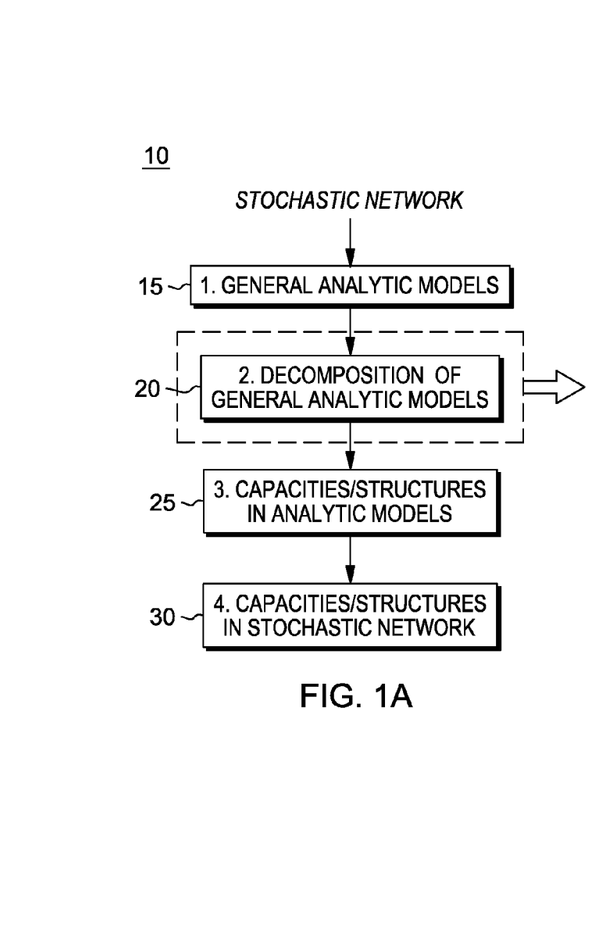
FIG. 1A illustrates the methodology 10 for managing capacities and structures in stochastic network in one embodiment.

FIG. 1A illustrates the general methodology 10 for managing capacities and structures in stochastic network in one embodiment. As indicated at 15 there is created an appropriate analytical model for the stochastic network. This includes mapping the stochastic network to a general analytic model. This can for example be a Brownian Motion network model or a Jackson definition of the general Queueing Network model, etc. The inputs to a program that performs the invention consists of a description of the stochastic network and the optimization problem to be solved, while the outputs from said program consists of a description of the decision variables for the stochastic network as solution of the optimization problem and a description of the performance characteristics of the stochastic network under these decision variable settings. Each of these descriptions can be provided in any manner that is appropriate for said program and the user interfaces that it supports. The choice of analytical model dictates the possible decompositions as well as the possible manners in which a subsequently performed evaluation step described herein below may be performed.

Then, at 20, there is performed steps for decomposing a general analytic model of the stochastic network into a set of smaller general analytic models. The decomposition can be based on a key aspect of the present invention in which each node of the stochastic network can always be viewed, studied and evaluated in isolation in terms of the statistical properties of how different types of work arrive to the node and of how these different types are processed/served at the node. Further decomposition can be possible by exploiting additional properties of the stochastic network, such as a priority structure in which one class of work has absolute priority over all other classes of work at a node or any set of nodes. The problem in general is that the statistical properties of these arrival and service processes for each node (or any further decomposition) are not known and are difficult to obtain in general. Upon decomposing the network in this manner as one non-limiting example, some of the variables are determined explicitly and any remaining variables (e.g., in non-product-form networks whose remaining variables cannot be explicitly obtained by other means) are determined by the method. That is, the system implementing programmed computer is configured to use a suitable decomposition model for the chosen analytical model to obtain an approximate solution to a capacity/structure optimization problem. This is done in an iterative fashion as illustrated in sub-steps 110-140. This step includes determining the capacities/structures for the set of analytic models as an intermediate solution for the capacities/structures of the stochastic network.

Then, at 25 the system implementing a programmed computer is configured to perform steps for determining the capacities/structures for the set of analytic models as an intermediate solution for the capacities/structures of the stochastic network. This includes receiving the best found optimal solution from the algorithm comprised of sub-steps 110-140 as the optimal capacity/structure. Typically, this intermediate solution is the same as the overall end solution, however the solution applies to the analytic models approximating the original stochastic network (as opposed to the solution of the original stochastic network). Namely, the decision variables of the corresponding optimization problem and the performance metrics of interest under these variable settings. As a non-limiting example, the output at 25 can include the number of resources (Drs., nurses, etc.) at each node of the network. Alternatively, the intermediate solution might be for a subset of the overall end solution. In addition, the intermediate solution might include certain properties of the optimal solution either in the stochastic network approximation or the original stochastic network. As a non-limiting example of such properties, the output at 25 can include determination that the optimal solution should share the same set of nurses (so called resource pooling) among multiple nodes in the network as opposed to partitioning this set of nurses among these multiple nodes.

Then, in FIG. 1A at 30, the system implementing a programmed computer is configured to perform determining the capacities/structures for the stochastic network starting at the intermediate solution for the capacities/structures using simulation-based methods. These simulation-based methods include, but are not limited to, sampling methods, stochastic approximations, Monte Carlo methods, variance-reduction methods, rare-event simulation, steady-state estimation methods, and so on (refer to S. Asmussen and P. W. Glynn, "Stochastic Simulation: Algorithms and Analysis", Springer, 2007). Then the system converts the identified optimal value for the analytical model (as chosen at step 15) to a corresponding value for the original stochastic network.

Figure 1B:
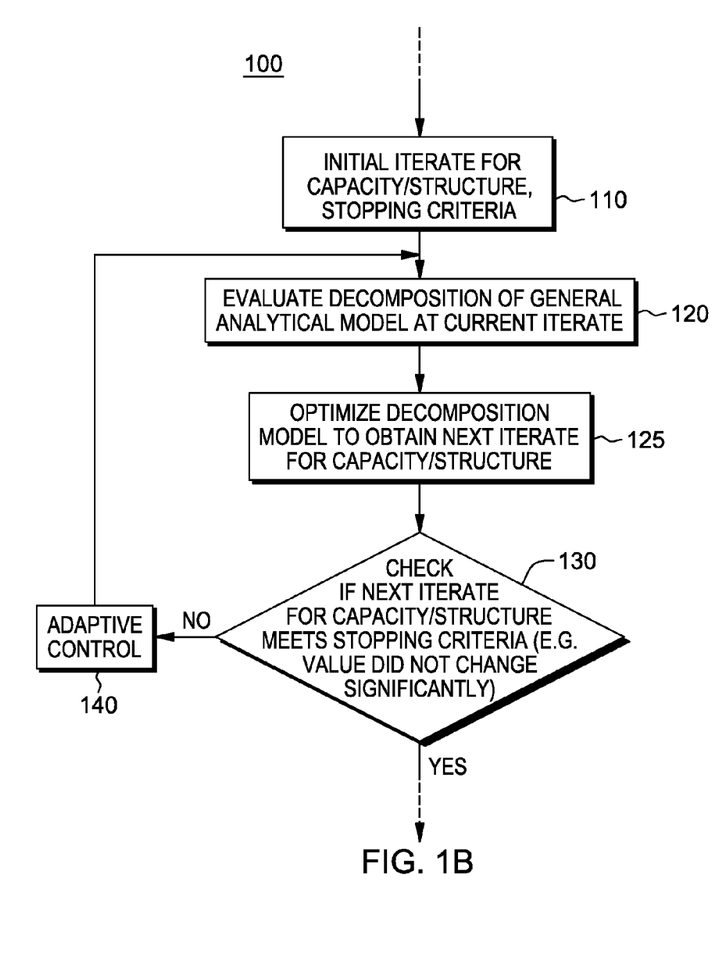
FIG. 1B illustrates detailed processing steps for decomposing the general analytic model in one embodiment.

FIG. 1B steps 100-130 show the steps for using a suitable decomposition model (for the chosen analytical model) to obtain an approximate solution to the capacity/structure optimization problem. This is done in an iterative fashion as illustrated in FIG. 1B.

For example, for the decomposition of general analytic model(s) at step 110, there is included a decision step to decide on an initial iterate value for the capacity/structure to be optimized, where the iterate values correspond to a set of decision variables to be optimized (both capacity and structure) and performance characteristic variables for a given iteration of sub-steps 110-130 and the initial iterate value corresponds to those used at the start of this iteration. As a non-limiting example, the algorithm might start with an initial number of 2 doctors and 2 nurses in the stochastic network of workflow through an emergency room of a hospital such as shown in the modeled stochastic network 400 of FIG. 4, where 1 doctor handles one type of work (node 410 in network), another doctor handles another type of work (node 420 in network), and both nurses are shared across multiple types of work (nodes 405, 408, 413 in network 400). In a further example, this flow model may include steps where a patient first receives service at node 1, and then moves to receive service at nodes 2 and 3 performed in parallel, and then receives service at nodes 4 and/or 5 performed in series. The numbers of doctors and nurses represent examples of iterate capacity values, whereas the sharing of resources and serial-parallel execution of nodes represent examples of iterate structure values. Then after one iteration of sub-steps 110-130, the corresponding capacities for doctors at a node 4 increase to 2, i.e., one nurse is exclusively assigned to service node 1, and three nurses are assigned to service both nodes 2 and 3. Then after another iteration of sub-steps 110-130, the capacities for doctors are increased to 4 and all are assigned to share service of nodes 4 and 5, the capacity of nurses at node 1 is increased to 2, and the capacity of nurses for shared service of nodes 2 and 3 is decreased to 2. And so on. This can be done in one of many possible ways, and depends on the chosen analytical model and decomposition. As a non-limiting example, even when the Brownian approximation of the stochastic network does not have a product-form solution, one can choose the product-form Brownian network that is closest (according to any distance metric of interest) to the non-product-form Brownian approximation and directly use the explicit product-form solution for the initial iterate values for capacities. Similarly, one can start with the structure of the original stochastic network for the initial iterate values for structure such that alternative structures (which do not violate constraints of the original problem) are considered as part of the iteration in sub-steps 110-130. Alternatively, the product-form solution for a corresponding Jackson network can be used in the same manner (refer to J. R. Jackson, "Jobshop-like Queueing Systems", *Management Science,* 10(1): 131-142, 1963). Additionally, at 110, there is a chosen a stopping criteria for the approximation algorithm. An example of such a stopping criteria is one that stops the running algorithm if the successive iterate values are not changing significantly.

Then, at step 120, FIG. 1B, there is performed an evaluation of the network at the current iterate to determine the parameters of the functional form of the decomposition model at the current iterate. Building upon the above non-limiting example, the current iterate values of 2 nurses providing shared service across nodes 1, 2 and 3, 1 doctor providing service at node 4 and 1 doctor providing service at node 5, and then at step 120 an evaluation of the network is performed under these capacity and structural settings with respect to the performance characteristics of the network related to the objective and constraints of the overall problem. As a non-limiting example of said performance characteristics, one might want to evaluate the average time spent by a patient during a visit through the emergency room in which there is provided two doctors and three nurses and under the above structure for resource sharing and patient flow through the emergency room. This evaluation also provides a correspondingly updated functional form for the objective function of interest. Then, at 125, there is performed an optimization of the decomposition model constructed in step 120 with the determined parameters and the corresponding functional form to obtain the next iterate of the optimization variable (capacity/structure). This optimization step reflects all the constraints placed on the decision process, which can include constraints such as fixed investment budget, minimum required service guarantees etc. The optimization objective can be one or more of: minimize measures of service quality (e.g., an average wait time, an average system time, etc.), minimize an overall budget required, etc. Further, the algorithm could be used in settings where some other (non-optimal) objective is used for determining the "best" or "desired" solution.

Then, at step 130, there is performed determining whether the new iterate meets the chosen stopping criteria (e.g., when the successive iterate values are not changing significantly). If yes, then the algorithm terminates and the current iterate is returned as the (approximate) optimal solution. If not, the system sets a new iterate as current value and returns to 120 to repeat evaluating the network at the (new) iterate to determine the parameters of the functional form of the decomposition model at the current iterate.

Alternately or in addition, in one embodiment, if determining the new iterate does not meet the chosen stopping criteria, the core solver used to determine the stochastic optimization under a specific network structure, implements an additional outer control loop determining which network structure from the feasible set should be investigated next, if any. Thus as shown at step 140, the outer control loop intelligently and adaptively prunes the network structures in the feasible set which is to be considered in such a way that a relatively small subset of feasible structures are considered for optimization.

Intelligence employed at the outer control loop 140 refers to the use of additional analytical models that predict the effect of the network structure given all the information gathered until that point in time. For example, if the network structure being varied is the allowed mix of resources of two or more types (e.g. nurses and orderlies), then additional analytical models may predict that if a combination of N nurses and O orderlies obtained a certain level of service, then any combination that did not have at least as many of each kind will always produce service of poorer quality, and hence can be pruned from the search.

Another example can be the case of parallel versus serial processing. Under certain conditions of the properties of the stochasticity of arriving patients, one form of processing may always produce worse results than the other until an inflection point, after which the reverse holds. The analysis of the situation within the inner levels may help users identify this inflection point, and check if the space of capacitizing is always to one side of this inflection point.

Returning back to FIG. 1A, after decomposing the general analytic model steps of FIG. 1B, at step 25 there is received the "best" found optimal solution from the algorithm as the optimal capacity/structure; then, at 30 there is performed converting the identified optimal value for the analytical model chosen to a corresponding value for the original stochastic network. The criteria for determining the "best" found optimal solution can be based on, as one representative non-limiting example, no improvement in the solution from one step to the next, or relatively small improvement over the most recent set of steps, etc. Some other ("non-optimal") objective may be used for determining the "best" or "desired" solution.

In one aspect, any subset combination of the steps in FIGS. 1A-1B can be implemented. As a non-limiting example, one might skip step 25 and go directly to step 30 after steps 15 and 20, in which case the solution would go from the optimal within the decomposition model to directly determining the optimal solution within the original model. Similarly, as another non-limiting example, one might stop the process after completing steps 15, 20 and 25 and thus use the optimal solution within the analytic models as an approximation for the optimal solution of the original stochastic network, taking advantage of the accuracy of the approximation together with the efficiencies with which it is obtained. And one can similarly skip step 20 or any of the sub-steps comprising step 20, as well as any other step or combinations of steps, in an analogous manner.

In one non-limiting example, there is considered an example of a stochastic network that consists of service stations indexed by $j=1, \ldots, J$ and customer classes indexed by $k=1, \ldots, K$. Customers of class k arrive from an exogenous source with rate $\alpha_k \geq 0$ and require service at station $\phi(k)$. The class k interarrival times, when $\alpha_k > 0$, are independent and identically distributed (i.i.d.) with mean $a_k = \alpha_k^{-1}$ and variance $\sigma_{a_k}^2 > 0$, and the class k service times are i.i.d. with mean $b_k = \beta_k^{-1} > 0$ and variance $\sigma_{b_k}^2 > 0$, where the interarrival and service processes are mutually independent. Define $\beta \cong (\beta_1, \ldots, \beta_K)$, $\sigma \cong [\sigma_{a_k}, \sigma_{b_k}]_{k=1,\ldots,K}$. Let $T_k(\beta, \sigma)$ be the stationary class-k customer sojourn time (possibly as a functional of class-k customer queue length). A Markov routing matrix P governs customer transitions among the classes where, upon completion of service at station $\phi(k)$, a class k customer transitions to a class k' customer with probability $P_{k,k'}$ and departs the system with probability $1 - \Sigma_{k'} P_{k,k'}$, independent of all else. Each station j employs a static work-conserving service discipline that only uses information about the customer classes at each scheduling decision instant.

One example of such a stochastic network for illustration is the class of business processes, a specific instance of which is patient flow through a hospital comprised of multiple classes of patients (e.g., based on disease, severity, etc.) being served by multiple classes of medical personnel (e.g., doctors, nurses, technicians, etc.). One capacity optimization problem of interest in this setting is to determine an amount of doctors to capacitate the network given a forecast of patient demand profiles. One example objective could be to minimize overall cost subject to constraints on various performance metrics of patient service, or alternatively to optimize performance metrics of patient service subject to a budget constraint(s), and the like.

In one embodiment, diffusion approximations of the stochastic network are considered. Diffusion approximations have been proposed to study performance characteristics (e.g., queue lengths, workloads, and sojourn times) for such multiclass stochastic networks. These diffusion approximations arise from so-called heavy-traffic limit theorems. The basic setup for these theorems consists of a sequence of stochastic networks indexed by some r, say with the same network topology, and with accompanying external interarrival, service, and routing processes that depend on r. As r grows large, the rth network approaches a critically loaded network. By scaling the performance characteristics appropriately in time and space, they admit a non-trivial (random) limit as $r \to \infty$. Upon carrying out this scheme, the K-dimensional per-class sojourn time process is approximated by a process that is described as follows:

It behaves like a Brownian motion (BM) in the interior of the orthant $R_+^K$, with drift and covariance matrix given by appropriate limits of the first two moments of (elementary functionals of) the interarrival, service and routing processes, and by the discipline of the networks. The approximating process is confined to $R_+^K$ by "pushing" on the boundary in the directions given by a reflection matrix R (also determined by the above quantities). The resulting diffusion approximation for the sojourn-time process is a reflected Brownian motion (RBM). It is often essentially J-dimensional in the sense that it is a non-random transformation of a J-dimensional RBM (by the so-called state-space collapse and snapshot principle).

In another embodiment, the approximation of the stochastic network is obtained via a stochastic approximation based on a decomposition of the network into stochastic models for each node (station) of the network in isolation. A functional form (a representative example of which is provided below) is then derived for any performance metric of interest across the entire network in terms of a functional form for this metric at each of the nodes comprising the network. In some cases, all the elements of the functional form are determined for each node such that the overall performance metric of interest can be calculated explicitly, and the optimal solution determined directly in terms of this explicit functional form.

In other cases, only a subset of the elements comprising the functional form are determined for each node. In such cases, a specialized form of numerical solution and/or stochastic simulation and/or other means are used to determine the remaining elements of the functional form for each node, which in turn yields an explicit functional form for the overall performance metric of interest. The optimal solution is then directly determined in terms of this explicit functional form for the overall performance metric of interest within the approximation of the original network.

Since this solution is for a stochastic approximation of the original network, it may be the case that the performance metric in the original network under this optimal solution differs from that under the stochastic approximation. In this case, the above procedure is repeated by creating a new specialized form of numerical solution and/or stochastic simulation and/or other means to determine the remaining elements of the functional form for each node under the parameters of this iterate. This procedure repeats until convergence to an optimal equilibrium.

As a specific example, a patient may first enter the emergency room of a hospital by seeing someone in the financial office to verify insurance information and then see a nurse for a preliminary evaluation. This evaluation may result in the patient seeing a doctor, having a series of medical tests (e.g., x-ray or CT scan), and then being discharged or admitted to the hospital for further treatment. Each of these stages of the patient flow through the hospital is represented by a node in the stochastic network. Assuming as a representative non-limiting example for illustration that the capacity optimization problem requires determining the number of nurses, doctors, technicians, etc. subject to some quality of service performance constraint on the patient flow time through the hospital, then this approach includes identifying a functional form for the time spent at each node of the stochastic network. Then, if all of the elements of each of these functional forms can be obtained explicitly, the optimal solution of the corresponding explct optimization problem is directly determined.

On the other hand, if not all of the elements are known, then the outstanding elements of the functional form for the time spent at each node of the stochastic network are obtained through a numerical solution or simulation or other means, such as a wide variety of stochastic approximations or limits (e.g., large deviations), applied to the stochastic network instance for the current iteration. The resulting explicit functional form is then used to directly determine the optimal solution of the corresponding explct optimization problem. This procedure repeats until convergence to an optimal equilibrium for identifying the number of nurses, doctors, technicians, etc. subject to some quality of service performance constraint on the patient flow time through the hospital. Alternatively, the objective could be to minimize overall cost subject to constraints on various performance metrics of patient service, or to optimize performance metrics of patient service subject to a budget constraint(s), and the like. The class of optimization problems of interest are of the form $$(OPT) \min_{\beta \in (0,\infty)^K} F(\langle w, T(\beta, \sigma) \rangle) \quad (1)$$

$$\text{s.t. } \langle c, \beta \rangle \leq C, \quad (2)$$

where w is the vector of per-class sojourn-time weights, $T(\beta, \alpha)$ is the vector of per-class sojourn time random variables, $F(\cdot)$ is a linear functional (e.g., expectation), c is the vector of per-class service-rate costs, and C is the overall cost limit Let $m_n(x)$ denote the separable (decomposed) stochastic model for the nth iteration that approximates the objective function $F(\langle w, T(x, \sigma) \rangle)$ in terms of the collection of functional forms for each node, which is denoted by $B_n$, for the nth iteration. The method implemented by a programmed solver (including one or more programmed processor units operatively connected with memory storage devices) is then based on the following iterative algorithm:

1. Starting Point. Select a starting point $\beta_0 = (\beta_{0,1}, \ldots, \beta_{0,K})$, a termination criteria $\epsilon_n$, and set n=0.

2. Separable Model. Define a separable model $m_n(x)$ together with the collection of functional forms $B_n$ for the nth iteration.

3. Iterative Step. Determine the decision variables $\beta_{n+1}$ that minimize the separable model $m_n(\cdot)$ together with the collection $B_n$.

4. Check for Termination. If $\|\beta_{n+1} - \beta_n\| < \epsilon_n$, then terminate with final solution $\beta_{n+1}$. Else, increment n by 1 and go to Step 2.

As a non-limiting example, consider once again flow through the emergency room of a hospital in which patients see nurses and doctors to address their medical needs as shown by the model 400 of FIG. 4. The nodes of the corresponding stochastic network represent the different stages of the patient flow through the emergency room. A starting point for the number of doctors and nurses at each node (or their service rates) can be obtained by determining the closest product-form Brownian network corresponding to a Brownian approximation of the original network (or product-form Jackson network corresponding to the original network), which can be determined explicitly since all variables of the functional forms are known. Then a separable model can be obtained in terms of the functional forms for the (non-product-form) Brownian approximation of the original network using the settings for unknown variables from the previous iteration, where as a non-limiting example the functional forms can represent the amount of time on average spent by a patient at each node of the network. Then the optimal decision variables, namely the number of doctors and nurses at each node (or their service rates), are determined for this explicit separable model in terms of its collection of functional forms, where as a non-limiting example the objective function might be to minimize the costs of doctors and nurses subject to some constraints on the time patients spend in the emergency room. Then a check is made to see if the number of doctors and nurses at each node of the network (or their service rates) differ by more than some termination criteria from the previous iteration: if so, then the iterative procedure is repeated, otherwise the procedure is terminated.

It is noted that the above iteration can be used with numerical solutions of the original stochastic network or of Brownian approximations of the original network, as well as simulations of the original stochastic network or of Brownian approximations of the original network, as well as any other approaches to solve the original stochastic network or stochastic approximations of the original network. Moreover, consideration and evaluation of alternative structural properties (such as the sharing of a pool of nurses to provide service across multiple nodes of the network and/or the execution of a set of nodes in series, in parallel or in any combination thereof) may be part of the inner loop of the above iteration, as well as part of an outer control loop. In other words, the adaptive control loop 140 in FIG. 1B can be instantiated within the above iteration, outside of the above iteration as part of an outer control loop, or any combination thereof.

There are properties of the objective function $F(\langle w, T(\beta, \sigma) \rangle)$ with respect to the service-rate vector $\beta$ relevant in this stochastic optimization methodology; the corresponding properties with respect to $\sigma$ are relevant as well. In one preferred embodiment, it is assumed each station employs a proportional scheduling discipline among its customer classes and assuming each class always has sufficient customers to be served, then such a stochastic network is equivalent to a corresponding set of Brownian networks and the optimization of stochastic networks can be addressed as an optimization of an equivalent set of Brownian networks.

The results that follow are extendable to the general case, and what follows is a description oriented to the special cases of single-class L-node tandem stochastic networks with external input only to the first station, the output of the k−1th node serving as the input of the kth node and the last node serving as the output out of the network.

Let $F(\cdot)$ be the expectation functional, and w as the vector of all ones. In such cases, for example, as described in J. M. Harrison reference entitled "The heavy traffic approximation for single server queues in series," *J. Appl. Prob.*, 10:613-629, 1973 there is shown that for the equivalent Brownian network the total stationary queue length of the network $T(\beta,\sigma)$ is distributed as $$\tilde{T}(\beta, \sigma) = \sup_{0 = t_L \leq t_{L-1} \leq \ldots \leq t_0 < \infty} \left[ \sum_{j=1}^{L} \{\zeta^j(t_{j-1}) - \zeta^j(t_j)\} \right],$$

where $$\zeta^j(t) = \sigma_{b_j} \xi^j(t) - \sigma_a \xi^a(t) - (\alpha - \beta_j)t$$

and $\xi^a, \xi^1, \ldots, \xi^L$ are mutually independent standard Brownian Motion stochastic processes. The quantities $\alpha$ and $\beta_j$ correspond to the arrival rate and service rates at each node of the original stochastic network. The total sojourn time of customers through this network can be calculated via an application of Little's law to the total queue length process (refer to J. D. C. Little, "A Proof of the Queueing Formula $L=\lambda W$", *Op. Res*, 9:383-387, 1961).

Application of the following result to the above representation shows that $\tilde{T}(\beta,\sigma)$ is convex in $\beta$ as well as in $\sigma$. Results of this type have been derived for a variety of problems (for example, see, J. G. Shanthikumar, D. D. Yao entitled "Strong stochastic convexity: closure properties and applications," *J. Appl. Prob.*, 28:131-145, 1991). Quantity $1/z$ is written for the vector with elements $1/z_i$. Specifically, given two functions $f:R^m \to R^n$ and $g:R^m \to R$ and a set $S \subset R^m$, the mapping $H:R^n \to R$ given by $$H(z) = \sup_{x \in S} [\langle z, f(x) \rangle + g(x)]$$

is convex on its domain. Moreover, if $f(x) \geq 0$ for $x \in S$, then $H(1/z)$ is convex on its domain. To establish this result, simply note that for $\delta \in [0,1]$, $$\sup_{x \in S}[\langle \delta z, f(x) \rangle + \delta g(x) + \langle (1-\delta)z', f(x) \rangle + (1-\delta)g(x)] \leq$$

$$\delta \sup_{x \in S}[\langle z, f(x) \rangle + g(x)] + (1-\delta) \sup_{x \in S}[\langle z', f(x) \rangle + g(x)],$$

for any $z, z'$ for which the right-hand side is finite. For the second claim, first use $$<1/(\delta z + (1-\delta)z'), f> \leq \delta <1/z, f> + (1-\delta)<1/z', f>$$

and then apply the same argument.

Another aspect addressed by the system and methodology is the choice of a separable model $m_n(x)$ for the iterative algorithm Note that the expected queue lengths in a tandem Brownian network with L stations has the general form $t(\beta, \tau(\beta))$, where $\tau(\beta)=(\tau_1(\beta), \ldots, \tau_L(\beta))$ and $$t(\beta, \tau) = \sum_{k=1}^{L} \frac{\tau_k}{\alpha - \beta_k}. \quad (3)$$

In the special case where the standard deviation vector $\sigma$ equals $(\hat{\sigma}, \ldots, \hat{\sigma}, \hat{\sigma}_L)$ for some $\hat{\sigma}, \hat{\sigma}_L$, the network admits a product-form solution (for example, as described in J. M. Harrison, et al., "Brownian models of feedforward queueing networks: quasireversibility and product form solutions," *Ann. Appl. Prob.*, 2:263-293, 1992) and $\tau(\beta)$ is independent of $\beta$, with $\tau_l(\beta)=\hat{\sigma}^2$ for $l=1, \ldots, L-1$ and $\tau_L(\beta)=(\hat{\sigma}^2+\hat{\sigma}_L^2)/2$. Motivated by these observations, models $m_n(x)$ are chosen from the family of functions of the form (3) parametrized by $\tau$, in the expectation that this (local) approximation is reasonable. These such functions are termed separable approximations. The following result, which is proved by applying standard Lagrangian methods, then becomes an essential ingredient in the analysis. Specifically, the minimum of $t(\beta,\tau)$ over $\beta \in (0,>)^L$ with $<c,\beta> \leq C$ is $\beta^*(\tau)$, where $$\beta_k^*(\tau) = \alpha + \left(C - \alpha \sum_{l=1}^{L} c_l\right) \frac{\sqrt{\tau_k/c_k}}{\sum_{l=1}^{L} \sqrt{\tau_l c_l}}. \quad (4)$$

More generally, the methods herein are based on considering functional forms such as described herein above, but where the values of some or all variables comprising this functional form, such as the $\tau_k$, are unknown. In such cases, as previously noted, a specialized instance of numerical solution and/or stochastic simulation and/or other means to estimate these variables may be used. In one embodiment, there is identified a general functional form for each node (station) in the stochastic network representing the system of interest, such as different stages (stations) of patient flow through a hospital. Equation (3) is one non-limiting example of such a functional form.

Any functional form can be used, typically exploiting various properties of the system of interest and its representative stochastic network. As a specific example, solely for the purposes of illustration and not limiting the invention in any way, a functional form can involve a characterization of how work arrives to each node in the network and a characterization of how work is processed/served at each node in the network. Such characterizations can include the first and second order statistical properties of said arrival processes and service processes, the details of which are typically based on exploiting properties of the stochastic network. Equation (3) is one non-limiting example in which the functional form is derived from the Brownian approximation of the original stochastic network. In general, some of the variables are not known and are obtained as described above. In the hospital example, $\tau_1/(\alpha-\beta_1)$ might represent the time a patient spends as part of an initial check-in to verify insurance (node 1 in the network), $\tau_2/(\alpha-\beta_2)$ might represent the time a patient spends as part of an initial evaluation by a set of nurses (node 2 in the network) and $\tau_3/(\alpha-\beta_3)$ might represent the time a patient spends as part of a subsequent evaluation by a set of doctors (node 3 in the network). There is next obtained explicitly as many elements of each of these functional forms by exploiting properties of the system and network under consideration. Since the variable a relates to the mean arrival rate of work (e.g., patients to the emergency room of a hospital) to the original stochastic network (a given input parameter), this variable is known explicitly by exploiting such properties of the stochastic network. When the Brownian approximation, or any relevant portions thereof, has a product-form solution, then the variables $\tau_k$ are also known and obtained explicitly through the product-form solution of the corresponding Brownian network. Finally, the variables $\beta_k$ represent the decision variables of the problem at hand and are to be obtained. For any remaining unknown elements, there is obtained outstanding elements of the functional form for each node of the stochastic network through a numerical solution or simulation or other means applied to the stochastic network instance for the current iteration. Once an explicit functional form is obtained for each node (station) in the stochastic network, then the optimal solution of the decision variables for the explicit objective function can be directly obtained by exploiting the properties of the explicit objective and the explicit optimization problem in general. Equation (4) is one example of such an optimal solution, but the present invention is not limited.

This procedure can be repeated in an iterative manner until convergence to an optimal equilibrium whenever not all elements of the functional form are identified.

A third aspect addressed by the methods herein is the choice of the starting point. Any number of approaches can be applied in this regard. In one preferred embodiment, for illustrative purposes, there is considered again the tandem stochastic network discussed above for L=2. Under the description above, the Brownian version of the network does not admit a product-form solution when the standard-deviation vector $\sigma=(\sigma_a, \sigma_{b_1}, \sigma_{b_2})$ satisfies $\sigma_a \neq \sigma_{b_1}$.

Then, for the scheme, one example choice for $\tau$ is $\hat{\tau}=(\sigma_{b_1}^2, (\sigma_{b_1}^2+\sigma_{b_2}^2)/2)$. A second example choice for $\tau$ that may be considered is $\overline{\tau}=((\sigma_a^2+\sigma_{b_1}^2)/2, (\sigma_{b_1}^2+\sigma_{b_2}^2)/2)$. These and other general approaches for identifying reasonable starting points for the iterative separable approximation based algorithm are included, such as any function of the model parameters (e.g., $(\sigma_a, \sigma_{b_1}, \sigma_{b_2})$) that leads to a product-form solution in the sense above.

It is understood that the system and method described may be used in an interactive sense, and can be employed in or as part of an interactive tool. One potential example is the incorporation of the present invention in IBM WebSphere® Business Modeler (A registered trademark of International Business Machines, Inc.). One non-limiting example of such a tool would include how to capacitate a hospital emergency room with doctors, nurses and technicians or other administrative people. The problem becomes how to capacitate the network, i.e., determine capacities, while achieving the minimum cost given all the capacities.

The network (general analytic model) is a simplification of the stochastic network underlying is the functional form—which includes a formula, and processed according to methods herein. For example, after obtaining an analytical model of stochastic network, then a decomposition step is performed which step may be used to determine how much time elapsed for people to arrive and stay at a station in the network. A feedback of the decomposition step is used to determine the best capacities.

Figure 2:
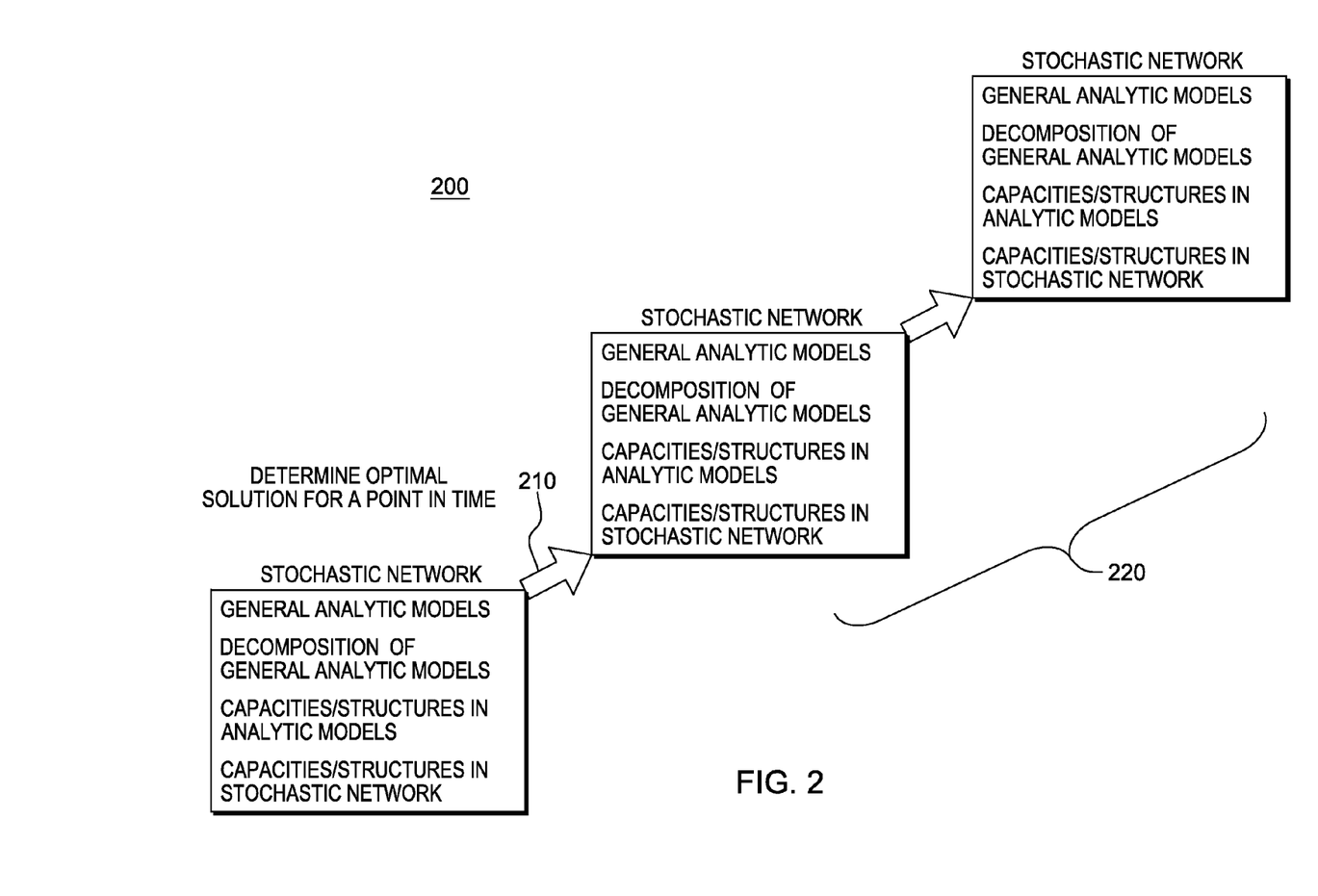
FIG. 2 depicts processing 200 in which there may be initially determined an optimal solution for a point in time, or, an optimal solution determined over multiple points in time or over a continuum of time.

In view of FIG. 2 there is depicted processing 200 that may occur in which the best solution is not initially obtained. Given a situation where the projected capacity is not met (number of Drs., nurses, etc.), then a multi-period optimization may be performed (optimization performed over multiple points in time). That is, given the stochastic network processing that occurs in accordance with processing described in FIGS. 1A, 1B, there may be initially determined an optimal solution 210 for a point in time, or, there may be determined optimal solution over multiple points in time or over a continuum of time as depicted at 220. As a specific non-limiting example, solely for purposes of illustration, it is not uncommon to have a situation where the existing resource capacities (number of doctors, nurses, etc.) are far from the best set of resource capacities for the modeled enterprise (hospital) making it too expensive (e.g., in time or costs) or not possible (e.g., insufficient resources in the marketplace) to move from the existing resource capacities to the desired best resource capacities in a single unit of time. In such cases, the present invention determines the best path to move the existing resource capacities to the desired best resource capacities over multiple periods of time. More specifically, the method determines the best set of actions (e.g., hiring, training, recruiting) at multiple points in time to migrate from the current state to the desired best state. The criteria for "best" in each of these cases can be based on, as one representative non-limiting example, lowest cost or highest revenue subject to some constraints, achieving a cost or revenue target, providing the best patient care, and so on, as well as any combination of such criteria. Further, the algorithm could be used in settings where some other (non-optimal) objective is used for determining the "best" or "desired" solution.

Figure 3:
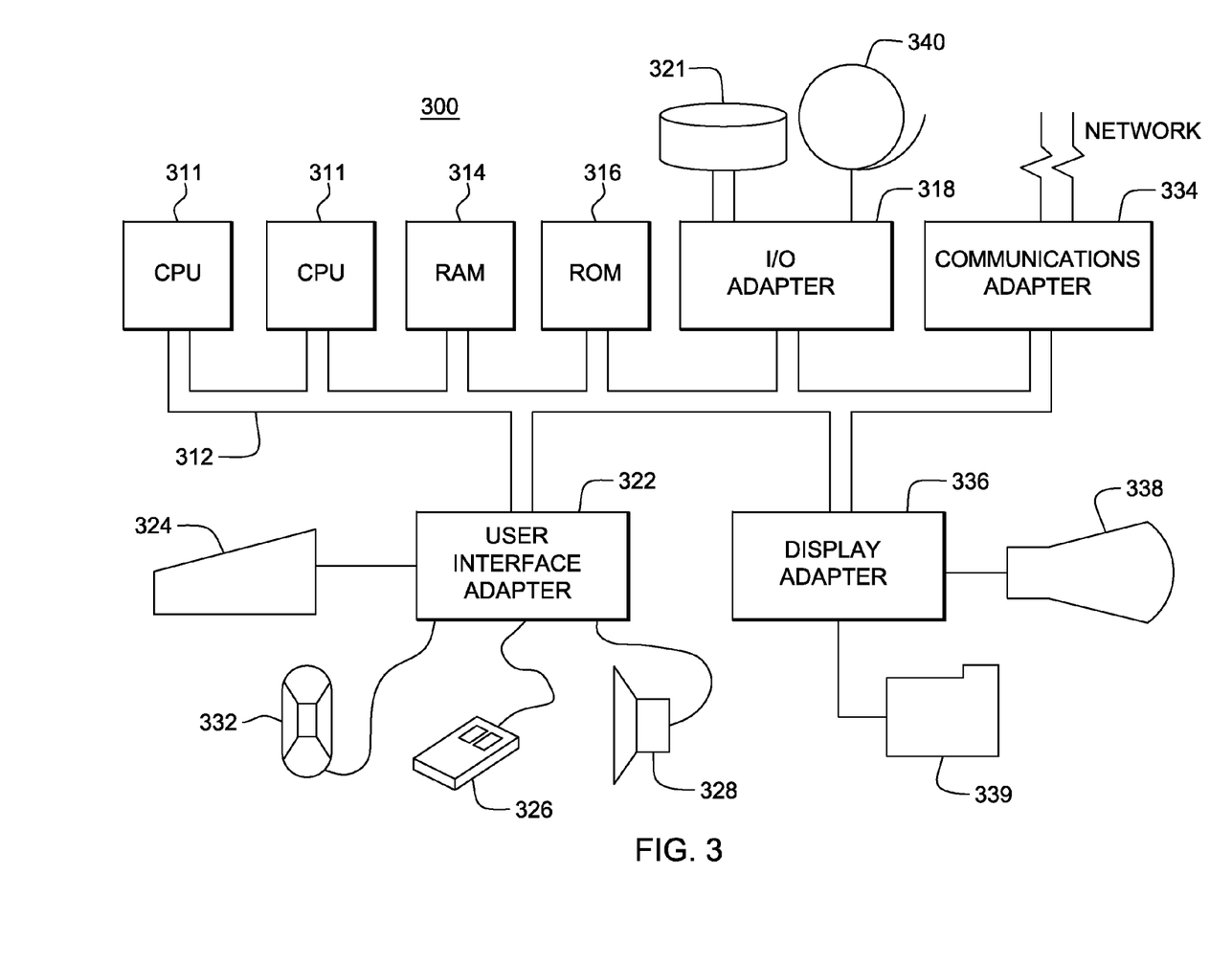
FIG. 3 illustrates an exemplary hardware configuration to run method steps described in FIGS. 1A, 1B-2 in one embodiment.

FIG. 3 illustrates an exemplary hardware configuration of the computing system 300. The hardware configuration preferably has at least one processor or central processing unit (CPU) 311. The CPUs 311 are interconnected via a system bus 312 to a random access memory (RAM) 314, read-only memory (ROM) 316, input/output (I/O) adapter 318 (for connecting peripheral devices such as disk units 321 and tape drives 340 to the bus 312), user interface adapter 322 (for connecting a keyboard 324, mouse 326, speaker 328, microphone 332, and/or other user interface device to the bus 312), a communication adapter 334 for connecting the system 300 to a data processing network, the Internet, an Intranet, a local area network (LAN), etc., and a display adapter 336 for connecting the bus 312 to a display device 338 and/or printer 339 (e.g., a digital printer of the like).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with a system, apparatus, or device running an instruction.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

We claim:

1. A computer-implemented method for managing structures in stochastic networks comprising:

creating a general analytical model for a stochastic network;

decomposing the general analytic model into a set of one or more decomposed analytic models;

generating an optimization problem based on capacities and a topological configuration of network structures in each of the one or more decomposed analytic models;

iteratively obtaining an approximate solution to the optimization problem by:

specifying an initial iterate value for the optimization variable of a capacity and a network structure to be optimized;

evaluating the network at a current iterate to determine the parameters of a functional form of each decomposed analytical model at the current iterate;

jointly optimizing the decomposed analytical models with the determined parameters to obtain a next iterate of the optimization variables of the capacities and network structures;

determining whether the next iterate meets a pre-determined stopping criteria, and one of:

returning the current iterate as values for the capacities and network structures as an approximate solution if the next iterate meets the pre-determined stopping criteria; or setting new iterate values for optimization variables of the capacities and the network structures to be optimized as current iterate values and repeating the evaluating, jointly optimizing and stopping criteria determining at the current iterate values to determine the parameters of the functional form of each decomposed analytic model; and determining the capacities and the topological configuration of network structures for the stochastic network based on the approximate solution, wherein a programmed hardware processor device is configured to perform one or more of the creating, decomposing, generating, specifying, evaluating, jointly optimizing and stopping criteria determining.

2. The computer-implemented method according to claim 1, wherein said network evaluating comprises: running, via a processor device, one or more of: numerical solutions and simulations to obtain parameters for the functional form of each decomposed analytic model.

3. The computer-implemented method according to claim 1, wherein the determining the capacities and the topological configuration of the structures for the stochastic network further comprises:
    converting an identified optimal value for the capacities and topological configuration of the structures of the general analytical model to a corresponding value for the original stochastic network.

4. The computer-implemented method according to claim 1, wherein the general analytical model is a general Queueing Network model.

5. The computer-implemented method according to claim 1, wherein the general analytical model is a Brownian Motion network model.

6. The computer-implemented method according to claim 1, wherein said stochastic network is represented as nodes, said method further including:
    performing adaptive control to model a sharing of a service provided across multiple nodes of the stochastic network and one or more of: executing a set of nodes topologically configured in series, in parallel or, in any combination thereof.

7. The computer-implemented method according to claim 1, wherein the jointly optimizing step reflects constraints placed on a decision process, the constraints comprising: a fixed investment budget, minimum required service guarantees.

8. The computer-implemented method according to claim 1, further comprising: determining the capacities and structures over multiple time periods or over a continuum of time.

9. The method of claim 1 wherein said topological configuration of network structures represents an ordering of resources connected within the network that process a workflow.

10. The method of claim 1 wherein said topological configuration of network structures is one of a feasible set of network topological configurations, wherein in response to determining a next iterate does not meet a pre-determined stopping criteria, said method further including:
    adaptively pruning network structures of said feasible set to reduce a number of potential network structures for consideration of optimization.

11. A system for managing structures in stochastic networks comprising:
    a memory storage device;
    a hardware processor device coupled to the memory storage device and configured to perform a method comprising:
    creating a general analytical model for a stochastic network;
    decomposing the general analytic model into a set of decomposed analytic models;
    generating an optimization problem based on capacities and a topological configuration of network structures in each of the one or more decomposed analytic models;
    iteratively obtaining an approximate solution to the optimization problem by:
        specifying an initial iterate value for the optimization variable of a capacity and a network structure to be optimized;
        evaluating the network at a current iterate to determine the parameters of a functional form of each decomposed analytical model at the current iterate;
        jointly optimizing the decomposed analytical models with the determined parameters to obtain a next iterate of the optimization variables of the capacities and network structures;
        determining whether the next iterate meets a pre-determined stopping criteria, and one of:
            returning the current iterate as values for the capacities and network structures as an approximate solution if the next iterate meets the pre-determined stopping criteria; or
            setting new iterate values for optimization variables of the capacities and the network structures to be optimized as current iterate values and repeating the evaluating, jointly optimizing and stopping criteria determining at the current iterate values to determine the parameters of the functional form of each decomposed analytic model; and
    determining the capacities and the topological configuration of network structures for the stochastic network based on the approximate solution.

12. The system according to claim 11, wherein said network evaluating comprises: running, via the hardware processor device, one or more of:
    numerical solutions and simulations to obtain parameters for the function of each decomposed analytic model.

13. The system according to claim 11, wherein the determining the capacities and the topological configuration of the structures for the stochastic network further comprises:
    converting an identified optimal value for the capacities and topological configuration of the network structures of the general analytical model to a corresponding value for the original stochastic network.

14. The system according to claim 11, wherein the general analytical model is a general Queueing Network model.

15. The system according to claim 11, wherein the general analytical model is a Brownian Motion network model.

16. The system according to claim 11, wherein said stochastic network is represented as nodes, said method further including: performing adaptive control to model a sharing of a service provided across multiple nodes of the stochastic network and one or more of: executing a set of nodes topologically configured in series, in parallel or, in any combination thereof.

17. The system according to claim 11, wherein the jointly optimizing step reflects constraints placed on a decision process, the constraints comprising: a fixed investment budget, minimum required service guarantees.

18. The system according to claim 11, wherein the capacities and structures are determined over multiple time periods or over a continuum of time.

19. The system of claim 11 wherein said topological configuration of network structures represents an ordering of resources connected within the network that process a workflow.

20. The system of claim 11 wherein said topological configuration of network structures is one of a feasible set of network topological configurations, wherein in response to determining a next iterate does not meet a pre-determined stopping criteria, said method further including:
    adaptively pruning network structures of said feasible set to reduce a number of potential network structures for consideration of optimization.

21. A computer program product for managing structures in stochastic networks, the computer program product comprising a storage medium, said storage medium not a propagating signal, said medium readable by a processing circuit and storing instructions run by the processing circuit for performing a method to:
    create a general analytical model for a stochastic network;
    decompose the general analytic model into a set of decomposed analytic models;

generate an optimization problem based on capacities and a topological configuration of network structures in each of the one or more decomposed analytic models, iteratively obtain an approximate solution to the optimization problem by configuring said processing circuit to:
  specify an initial iterate value for the optimization variable of a capacity and a network structure to be optimized;
  evaluate the network at a current iterate to determine the parameters of a functional form of each decomposed analytical model at the current iterate;
  jointly optimize the decomposed analytical models with the determined parameters to obtain a next iterate of the optimization variables of the capacities and network structures;
  determine whether the next iterate meets a pre-determined stopping criteria, and one of:
  return the current iterate as values for the capacities and network structures as an approximate solution if the next iterate meets the pre-determined stopping criteria; or
  set new iterate values for optimization variables of the capacities and the network structures to be optimized as current iterate values and repeat the evaluating, jointly optimizing and stopping criteria determining at the current iterate values to determine the parameters of the functional form of each decomposed analytic model;
  and
  determine the capacities and the topological configuration of network structures for the stochastic network based on the approximate solution.

22. The computer program product according to claim 21, wherein to evaluate the network comprises: running, via the hardware processor device, one or more of: numerical solutions and simulations to obtain parameters for the function of each decomposed analytic model.

23. The computer program product according to claim 21, wherein the determining the capacities and topological configuration of the structures for the stochastic network further comprises:
  converting an identified optimal value for the capacities and topological configuration of the network structures of the general analytical model to a corresponding value for the original stochastic network.

24. The computer program product of claim 21 wherein said topological configuration of network structures is one of a feasible set of network topological configurations, wherein in response to determining a next iterate does not meet a pre-determined stopping criteria, said method further including:
  adaptively pruning network structures of said feasible set to reduce a number of potential network structures for consideration of optimization.

* * * * *